US009925515B1

(12) United States Patent
Kabir et al.

(10) Patent No.: US 9,925,515 B1
(45) Date of Patent: Mar. 27, 2018

(54) ALKYL FUNCTIONALIZED POROUS SILICA LIQUID CHROMATOGRAPHIC STATIONARY PHASES AND SOLID PHASE EXTRACTION SORBENTS

(71) Applicants: Abuzar Kabir, Dhaka (BD); Kenneth G. Furton, Homestead, FL (US)

(72) Inventors: Abuzar Kabir, Dhaka (BD); Kenneth G. Furton, Homestead, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 15/468,530

(22) Filed: Mar. 24, 2017

(51) Int. Cl.
*B01J 20/10* (2006.01)
*B01J 20/283* (2006.01)
(Continued)

(52) U.S. Cl.
CPC ........... *B01J 20/22* (2013.01); *B01D 15/08* (2013.01); *B01J 20/103* (2013.01); *B01J 20/28047* (2013.01); *B01J 20/291* (2013.01); *B01J 20/3021* (2013.01); *B01J 20/3204* (2013.01); *B01J 20/3217* (2013.01);
(Continued)

(58) Field of Classification Search
CPC . B01J 20/02; B01J 20/103; B01J 20/10; B01J 20/3204; B01J 20/3242; B01J 20/3244; B01J 20/3246; B01J 20/3248; B01J 20/3253; B01J 20/3255; B01J 20/3261; B01J 20/3263; B01J 20/28; B01J 20/283; B01J 20/286; B01J 20/287; B01J 20/288; B01D 15/20; B01D 15/26; B01D 15/325; B01D 15/32; G01N 30/48; G01N 30/482; G01N 2030/484
See application file for complete search history.

(56) References Cited

U.S. PATENT DOCUMENTS 5,869,152 A * 2/1999 Colon ................. B01J 20/287
 210/506
7,563,367 B2 * 7/2009 Rustamov ............ B01J 20/286
 210/198.2
(Continued)

OTHER PUBLICATIONS

Cao et al. Synthesis of highly porous organic/inorganic hybrids by ambient pressure sol-gel processing. Journal of Sol-Gel Science and Technology 13, 305-309 (1998).*

*Primary Examiner* — Katherine Zalasky
(74) *Attorney, Agent, or Firm* — Saliwanchik, Lloyd & Eisenschenk

(57) ABSTRACT

A chromatographic stationary phase or solid phase extraction (SPE) sorbent are sol-gel metal oxide particles comprising metal oxide network units with organic functionality bonded to the metal of the metal oxide and possess a higher performance or capacity than that of conventional ligand coated silica particles. The organic functionality is distributed throughout the metal oxide particle and wherein the mole percent of metals of the metal oxides with bonded organic functionality is in excess of nine mole percent of the particle. The particles are prepared from sol-gel processing employing an acid catalyst or an acid catalyst followed by a base catalyst to metal oxide precursors, at least nine mole percent of which have organic functionality. The particles are processed from a sol-gel condensation product into a size depending on the intended use.

13 Claims, 14 Drawing Sheets

(51) Int. Cl.
*B01J 20/30* (2006.01)
*B01J 20/28* (2006.01)
*B01J 20/22* (2006.01)
*B01D 15/08* (2006.01)
*B01J 20/291* (2006.01)
*B01J 20/32* (2006.01)
B01D 15/20 (2006.01)
B01J 20/281 (2006.01)
B01D 15/26 (2006.01)

(52) U.S. Cl.
CPC ........... *B01J 20/3293* (2013.01); *B01D 15/26* (2013.01); *B01J 20/3246* (2013.01); *B01J 20/3248* (2013.01); *B01J 20/3261* (2013.01); *B01J 2220/52* (2013.01); *G01N 30/482* (2013.01)

(56) References Cited

U.S. PATENT DOCUMENTS

| | | | |
|---|---|---|---|
| 7,919,177 B2* | 4/2011 | Jiang | B01J 20/103 210/656 |
| 2005/0003188 A1* | 1/2005 | Bass | B01J 31/1633 428/402 |

* cited by examiner

| Compound | Molecular Weight | Log Kow | Chemical Structure |
|---|---|---|---|
| Furfuryl Alcohol (FA) | 98.10 | 0.3 | |
| Piperonal (PIP) | 150.13 | 1.05 | |
| Phenol (PHE) | 94.11 | 1.5 | |
| Benzodioxole (BDO) | 122.12 | 2.08 | |
| 4-Nitrotoluene (4NT) | 137.14 | 2.45 | |
| 9-Anthracene Methanol (9AM) | 208.26 | 3.04 | |
| Naphthalene (NAPH) | 128.17 | 3.35 | |
| 1,2,4,5-Tetramethyl Benzene (TMB) | 134.22 | 4 | |
| Triclosan (TCL) | 289.54 | 4.53 | |
| Diethylstilbestrol (DESB) | 268.35 | 5.07 | |

FIG. 2

Tetramethyl Ortosilicate (TMOS)

Octadecyltrimethoxysilane

Trimethoxy (2-phenylethylyl silane)

ALKYL FUNCTIONALIZED POROUS SILICA LIQUID CHROMATOGRAPHIC STATIONARY PHASES AND SOLID PHASE EXTRACTION SORBENTS

BACKGROUND OF INVENTION

All "so called" bonded phases used in high performance liquid chromatography (HPLC), ultra-performance liquid chromatography (UPLC), and solid phase extraction (SPE) use silica particles as the inert substrate material. The surface of silica particles is heterogeneous, with a variety of different types of silanol groups present on the surface. Although silica can be used as HPLC stationary phase or as an SPE sorbent without further modification, to increase a phase's applicability and adaptability, the surface of the silica material is modified by bonding a wide variety of functional groups to the surface. The nature of the functionality can be non-polar (e.g. an alkyl group), polar (e.g. $NH_2$), ionic (e.g. propylsulphonic acid) or be combined to present a mixed-mode. In general, the hydrophobic nature of silica based sorbents is entirely dependent upon the bonded groups.

These bonded silica sorbent particles are manufactured by reaction of an organosilane with the silica surface. The organosilanes consist of a silicon atom bonded to an organic functional group, for example an octadecyl (C18) group, and one to three chlorines. The two common types of organosilanes are monofunctional organosilanes having one chlorine, and trifunctional organosilane having three chlorines. Monofunctional organosilanes yields a product having a more lightly loaded surface with more active silanol groups than do trifunctionally bonded silicas. The surface with numerous accessible silanol groups provides a polar character to sorbents manufactured using monofunctional silanes (e.g. ISOLUTE MF C18), which can be very useful. However, sorbents manufactured using monofunctional silanes tend to be less stable at the extremes of pH because of the single point of attachment of the silane to the silica particle. Trifunctional bonding chemistry gives rise to somewhat of a "polymeric surface" that exhibits a higher organic functional group loading and fewer silanol groups due to some hydrolysis and condensation between trifunctional silanes.

This state of the art approach to preparing bonded silica particles result in a number of inherent shortcomings. For example, a thin coating of the bonded phase must provide all of the required analyte/sorbent/stationary phase interactions, which imposes a requirement of a high volume of stationary phase loaded into a long column size to achieve a large sample break-through volume, which is the maximum sample volume that can be passed through the column without saturating the bed with the analytes. Often there is an insufficient organic group loading per unit mass of the stationary phase/SPE sorbent to achieve adequate separation or absorption. The state of the art stationary phases display a very narrow range of pH stability, typically, at best, having a robust stationary phase when maintained within a pH range of 2 to 8.

Hence, there remains a need for silica based materials for chromatograph and sorption materials that avoid the shortcomings of surface bonded silica particles that display poor hydrolytic stability due to the ease of eroding a surface functionality from the surface. The new approach eliminate the use of preformed silica particles as the inert surface to graft different alkyl pendant groups via silane surface modification, resulting in surface Si—O—Si—C8/C18 linkage, which is known to possess poor hydrolytic stability. This poor hydrolytic stability of surface Si—O—Si—C8/C18 linkage results in a narrow pH stability (pH 2-8) of the silica based commercial HPLC stationary phases and SPE sorbents. As such, exposing these stationary phases and SPE sorbents beyond the narrow working pH range severely compromise the structural and chemical integrity of these materials.

BRIEF SUMMARY

An embodiment of the invention is directed to a chromatographic stationary phase or solid phase extraction (SPE) sorbent that comprises sol-gel metal oxide particles comprising metal oxide network units with organic functionality bonded to the metal of the metal oxide, where the organic functionality is selected from alkyl, substituted alkyl, aryl, or any combination thereof. The organic functionalities are distributed throughout the particles and the mole percent of metals of the metal oxides with bonded organic functionality is 9 to 100 mole percent. The metal oxides are oxides of silicon, titanium, aluminum, zirconium, germanium, barium, gallium, indium, thallium, vanadium, cobalt, nickel, chromium, copper, iron, zinc, boron or any mixture thereof and where the organic functionalities are substituted or unsubstituted linear or branched C1 to C24 alkyl, substituted or unsubstituted aryl wherein the substituent is phenyl, amino, alkylamino, hydroxyl, alkoxyl, arylamino, cyano, fluoro, phenyl, cyclodextrin, crown ether, cryptand, calixarene, or any derivative thereof. The metal oxide can be silicon oxide. The organic functionalities can be, but are not limited to methyl, octyl, octadecyl, phenyl, 2-phenylethyl, 3-aminopropyl, 3-(2-aminoethylamino)propyl, 3-methylaminopropyl, 3-phenylaminopropyl, and 3-(2-benzylaminoethyl)propyl.

Another embodiment of the invention is directed to a method of preparing a chromatographic stationary phase or SPE sorbents, where a multiplicity of at least one first metal oxide precursor is provided where at least nine percent of the metal oxide precursors have one or two organic functionalities bonded to the metal oxide precursor, is mixed with a solvent or solvent mixture, acid, and water to form a sol. Optionally, in a subsequent step additional second metal oxide precursors can be added that are the same or different from the first metal oxide precursors. Optionally, a base can be added to the sol and the sol held with or without warming until a gel is formed from the sol. The gel is crushed or grinded to form the sol-gel metal oxide particles that comprise the chromatographic stationary phase or SPE sorbent.

Metal oxides precursors are of the structure $MR^1R^2R^3R^4$ where M is silicon, titanium, aluminum, zirconium, germanium, barium, gallium, indium, thallium, vanadium, cobalt, nickel, chromium, copper, iron, zinc, boron or any mixture thereof where $R^1$ and $R^2$ are hydrogen, alkoxy, hydroxy, halide, or dialkylamino, $R^3$ and $R^4$ are optionally hydrogen, alkoxy, hydroxy, halide, or dialkylamino, which are lost on hydrolysis to form hydroxyl groups, a majority of which condense to form the metal oxide, and at least some of $R^3$ and $R^4$, independently, are absent or are substituted or unsubstituted linear or branched C1 to C24 alkyl, substituted or unsubstituted aryl wherein the substituent is phenyl, amino, alkylamino, hydroxyl, alkoxyl, arylamino, cyano, fluoro, phenyl, cyclodextrin, crown ether, cryptand, calixarene, or any derivative thereof.

The acid can be any strong or weak acid, including hydrochloric acid, trifluoracetic acid, acetic acid, hydrofluoric acid, and oxalic acid. The base can be any strong or weak base, including sodium hydroxide, potassium hydroxide, ammonium hydroxide, or an aminoalkylsilane. The solvent can be any organic solvent or mixture of organic solvents that have appropriate polarity to dissolve the metal oxide precursor and allow mixture with the acid and water, and can be, but are not limited to C1 to C3 alcohol or a mixture of a C1 to C3 alcohol and methylene chloride. The final particle sizes can be 40 to 50 microns for SPE sorbent and 2 to 5 microns for chromatography stationary phases or any other size and can be a narrow distribution of sizes or a broad range of sizes.

In an embodiment of the invention, solid phase extraction is performed using a device comprising the SPE sorbent in an environment containing a compound to be remove from the environment. The environment can be water, soil, air, or other fluids. The device can be of any shape and size that promotes retention of the SPE sorbent particles while contacting the environment.

In another embodiment of the invention a chromatography column is constructed where the column packing is the chromatographic stationary phase according to an embodiment of the invention. Because the organic functionality are dispersed over and within the entire particle, the amount of functionality per volume of the stationary phase can be significantly higher than that possible by coating a silica particle with a silicon coupling agent as is currently practiced in the industry as the silane coupling agent is connected via a single Si—O—Si bond and not the plurality of Si—O bonds which are statistically of low likelihood to simultaneously be broken to allow diffusion of the functionality form the silica particles. Furthermore, the amount of functionality on the particle is not limited to the number of residual silanol groups on the surface of the silica particles that are treated.

BRIEF DESCRIPTION OF DRAWINGS

FIG. 2 shows the structure and provides the log $K_{ow}$ of the analytes of FIG. 1.

DETAILED DISCLOSURE

Figure 1:
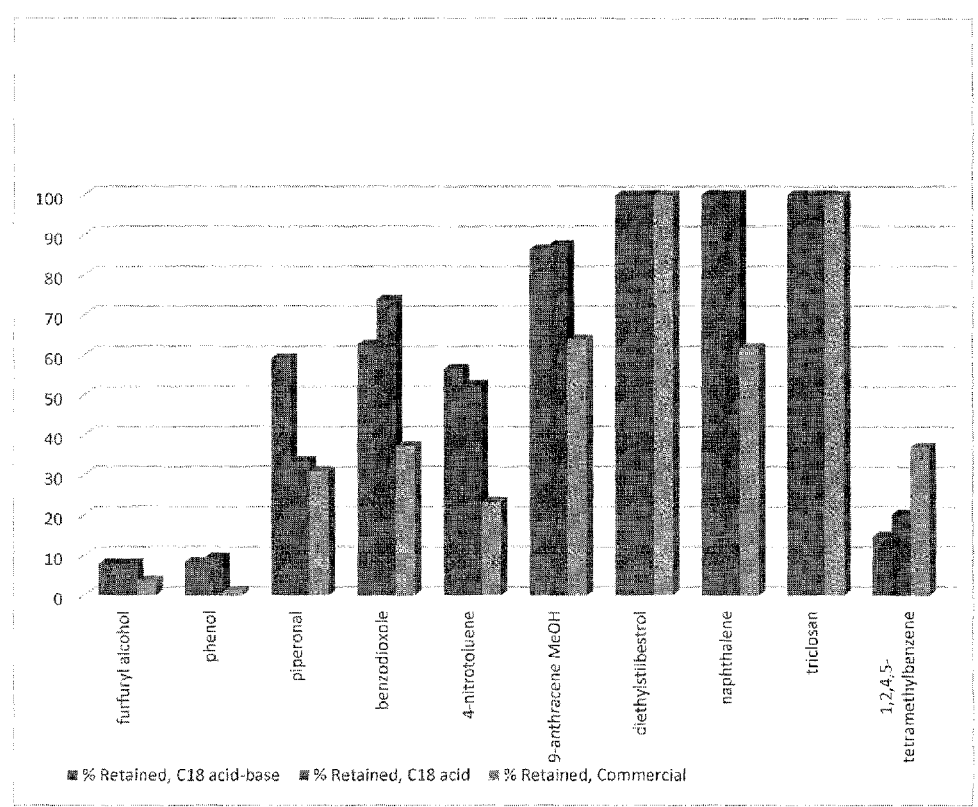
FIG. 1 shows a bar chart of the degree of absorption of various analytes by a sol-gel C18 sorbent, according to an embodiment of the invention.

Embodiments of the invention are directed to sol-gel synthesis of alkyl functionalized (e.g., C4, C8, C12, C18) high performance liquid chromatographic (HPLC) stationary phases and solid phase extraction (SPE) sorbents. The synthetic method employs a tetrafunctional silane and a trifunctional silane containing a sorbent functionality, for example, tetraalkoxy silane and an alkyltrialkoxy silane or their equivalents in presence of either an acid catalyst, an acid catalyst followed by a base catalyst, or a base catalyst.

Analysis by a reverse phase chromatography method or sampling by a solid phase extraction method where matrix pH adjustment allows removal and separation of highly acidic and basic compounds in the compounds' neutral state. The sol-gel synthesis method integrates the alkyltrialkoxy silane and tetralkoxysilane into a three dimensional polymeric network via hydrolysis followed by polycondensation, to yield a chemically and structurally more stable highly porous hybrid inorganic-inorganic material. Due to the high porosity and extremely high surface area, the HPLC stationary phase and SPE sorbents offer more analyte-alkyl functional group interactions per unit mass of the stationary phases/SPE sorbents; consequently minimizing the required mass of the stationary phases/SPE sorbents to achieve target chromatographic separation or extraction efficiency. Additionally, consumption of organic solvents in chromatographic separation and sample preparation is significantly reduced.

The method according to embodiments of the invention is a sol-gel synthesis approaches to create various alkyl/aryl functionalized, including, but not limited to, $C_6H_5$, $C_4H_9$, $C_8H_{17}$, $C_{12}H_{25}$, $C_{18}H_{37}$ alkyl substituted high performance liquid chromatographic (HPLC) stationary phases and solid phase extraction (SPE) sorbents using a trialkoxy silane and an alkyl trialkoxysilane or aryl trialkoxysilane in presence of an acid catalyst, an acid catalyst followed by a base catalyst, or a base catalyst. Optionally, a tetraalkoxy silane can be included or used without the trialkoxysilane. The alkoxy groups can be methoxy, ethoxy, propoxy, or any mixture thereof. The resulting particulate gel is a three dimensional polymeric network that is highly porous, and is chemically and structurally stable. Due to the high porosity and very high surface area, the HPLC stationary phase and SPE sorbents that comprises these gels offer more analyte-alkyl or analyte-aryl functional group interactions per unit mass of the stationary phases or SPE sorbents than is presently available. The high performance sol-gel material can be an SPE sorbent with a 40-50 μm particle size, a conventional high performance liquid chromatographic (HPLC) stationary phases with a ~5 μm particle size and ultra-performance liquid chromatography (UPLC) stationary phases with a ~2 μm particle size.

This SPE and chromatographic stationary phases using the sol-gel materials according to embodiments of the invention, eliminate the use of a silica substrate as the host matrix to hold different alkyl/aryl pendant groups that grafted on the silica substrate's surface via silane surface modification strategies. This sol-gel material provides a superior alternative to the conventional silica coated approach for reverse phase HPLC stationary phases and SPE sorbents, as the sol-gel materials integrate the alkyl/aryl pendant group to a sol-gel network.

In other embodiments of the invention the sol-gel synthesis can be carried out with one or more a variety of different precursors of the structure $MR^1R^2R^3R^4$ where M is silicon, titanium, aluminum, zirconium, germanium, barium, gallium, indium, thallium, vanadium, cobalt, nickel, chromium, copper, iron, zinc, boron or any mixture thereof. Two or more of $R^1$, $R^2$, $R^3$ and $R^4$ are hydrogen, alkoxy, hydroxy, halide, or dialkylamino, and the remaining $R_1$, $R_2$, $R_3$ and $R_4$ independently are, depending on M, absent or are alkyl, arylene, cyanoalkyl, fluoroalkyl, phenyl, cyanophenyl, biphenyl, cyanobiphenyl, dicyanobiphenyl, cyclodextrin, crown ether, cryptand, calixarene, or any derivative thereof. Depending upon M, the sol-gel synthesis can be uncatalyzed, acid catalyzed, base catalyzed, or an acid and base catalysis can be carried out in a plurality of steps. The metal cations can be chelated by acid. When a plurality of $MR^1R^2R^3R^4$ precursors are used, the hydrolysis of individual precursors or partial mixtures of precursors can be carried out with or without condensation, where the degree of condensation is short of a gel point, and the hydrolyzed and these uncondensed or partially condensed intermediate hydrolysates can be mixed and the combined hydrolysates condensed to the desired gels. The $MR^1R^2R^3R^4$ precursors in the mixture can differ by identity of any of M, $R^1$, $R^2$, $R^3$ and/or $R^4$.

The hydrolysis and condensation can be catalyzed by the addition of an acid or a base. An acid or base catalyst is not necessary when one or more of $R^1$, $R^2$, $R^3$ and $R^4$ of any precursor in the mixture is a Cl, Br, I, or dialkylamino group. An acid catalyst can be a Bronsted acid or a Lewis acid and the base can be a Bronsted base or a Lewis base. The acid can be a strong acid or a weak acid and the base can be a strong base or a weak base. Acids can be chosen from organic acids or inorganic acids and bases can be chosen from organic bases or inorganic bases. Acids that can be used include, but are not limited to, acetic acid, trifluoroacetic acid, trifluoromethylsulfonic acid, benzoic acid, oxalic acid, carbonic acid, boric acid, sulfuric acid, hydrochloric acid, hydrobromic acid, hydroionic acid, chloric acid, perchloric acid, phosphoric acid, ferric chloride, aluminum chloride, stannous chloride, copper chloride, or zinc chloride. Bases that can be used include, but are not limited to, aluminum hydroxide, ammonium hydroxide, lithium hydroxide, sodium hydroxide, potassium hydroxide, ammonium hydroxide, alkyl amine, dialkyl amine, trialkyl amine, pyridine, or aniline.

The preparation of the sol-gel synthesis can be carried out in a solvent. The solvent can be any solvent that can be removed to a large degree. The solvent can be, but is not limited to, methanol, ethanol, n-propanol, i-propanol, diethyl ether, ethyl acetate, tetrahydrofuran, acetone, methylene chloride, chloroform, acetonitrile, dimethylsulfoxide, or any compatible mixture thereof. The solvent should be one that can be removed as a volatile or washed from the sol-gel material by a volatile solvent.

According to an embodiment of the invention, a sol-gel hybrid inorganic-organic material is a reverse phase HPLC stationary phases in a HPLC column. Due to its high porosity and large surface area a superior chromatographic selectivity results. The solvent stability for reverse phase HPLC stationary phases and SPE reverse phase sorbents is particularly advantageous.

The sol-gel hybrid inorganic-organic material does not employ a silica substrate as the host matrix for alkyl/aryl pendant groups grafted on the silica substrate as a surface bound functionality. The sol-gel preparation allows the integration of alkyl/aryl pendant group in a porous silica network to result: in a higher surface area; a superior hydrolytic stability; extended pH stability (pH 1-12) with higher carbon loading; lower back-pressure; higher chromatographic separation power with a substantially high number of theoretical plates (N) pre equivalent length of chromatographic column; higher extraction efficiency; higher sample capacity: lower consumption of organic solvents for chromatographic separation/SPE elution; and the elimination of solvent evaporation and sample reconstitution when used as SPE sorbents. For example, an exemplary sol-gel C18 material when employed as a SPE sorbent is superior to commercially available C18 SPE sorbents, particularly with respect to the Brunauer-Emmett-Teller (BET) adsorption isotherm of the sol-gel sorbents and the commercial C18, as shown in FIG. 1, for the compounds tested provided in FIG. 2. A comparison of the sorbent structures from a sol-gel process relative to commercial sorbent using coated silica particles is given in Table 1, below; for sol-gel sorbents formed as in compositions 1 and 2 described below.

TABLE 1

BET surface area, pore volume, and average pore width of sol-gel C18 and commercial C18 SPE sorbents

| Sorbent | BET Surface Area in $m^2/g$ | Pore Volume in $cm^3/g$ | Average Pore width in Å |
|---|---|---|---|
| Commercial C18 SPE | 345.7607 | 0.724864 | 83.6574 |
| Sol-gel C18 (acid catalyzed) | 0.3617 | 0.004011 | 443.59 |
| Sol-gel C18 (acid-base catalyzed) | 649.1233 | 0.436021 | 26.9 |

Methods and Materials

Composition 1: Sol-Gel C18 Particles Using Acid Catalysis

Figure 3:
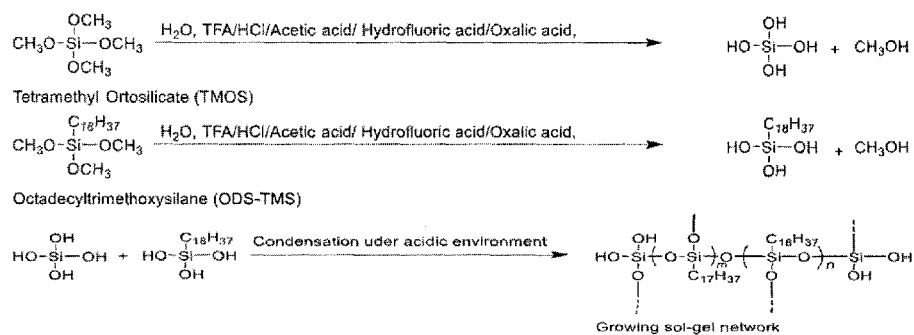
FIG. 3 shows an idealized reaction scheme for the hydrolysis and condensation to a sol-gel C18 sorbent, according to an embodiment of the invention, where an acid hydrolysis of tetraalkoxy and C18 trialkoxy silanes is followed by acid condensation of the silanols formed upon hydrolysis.

As conceptually illustrated in FIG. 3, a 3.08 molar ratio of tetramethoxysilane (2000 μL) and n-octadecyl trimethoxysilane (2000 μL) were combined in in methanol (2000 μL). To the homogeneous solution was added a solution of 3960 μL of trifluoroacetic acid and 40 μL of water with vortex mixing. A bed of white sol-gel C18 particles precipitated and the bed was held at 50° C. for two days. The bed of adhering particles was ground and washed with methylene chloride. The ground particles were screened to isolate a narrow particle size distribution of C18 particles.

Composition 2: Sol-Gel C18 Particles (Acid Catalyzed)

As conceptually illustrated in FIG. 3, tetramethoxysilane (1000 μL) and n-octadecyl trimethoxysilane (300 μL) were combined in in 6000 μL of a 1:1 by volume mixture of methylene chloride and methanol. To the homogeneous solution was added 470 μL of 0.1 M hydrochloric acid with vortex mixing. The acid solution was stirred at 50° C. for 12 hours. A bed of white sol-gel C18 particles precipitated and the bed was held at 50° C. for two days. The bed of adhering particles was ground and washed with methylene chloride. The ground particles were screened to isolate a narrow particle size distribution of C18 particles.

Composition 3: Sol-Gel C18 Particles (Acid Catalyzed Followed by Base Catalyzed)

Figure 4:
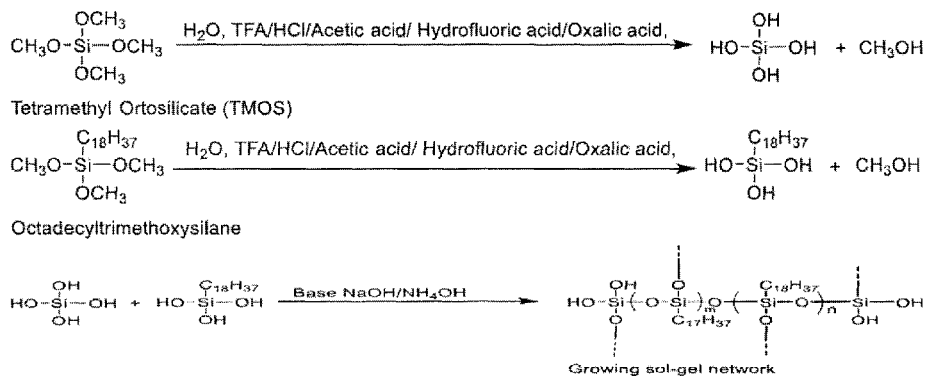
FIG. 4 shows an idealized reaction scheme for the hydrolysis and condensation to a sol-gel C18 sorbent, according to an embodiment of the invention, where an acid hydrolysis of tetraalkoxy and C18 trialkoxy silanes is followed by base condensation of the silanols formed upon hydrolysis.

As conceptually illustrated in FIG. 4, tetramethoxysilane (400 μL) and n-octadecyl trimethoxysilane (120 μL) were combined in in 3040 μL of isopropanol. To the homogeneous solution was added 188 μL of 0.1 M hydrochloric acid with vortex mixing. The acid solution was stirred at 50° C. for 12 hours. A bed of white sol-gel C18 particles precipitated and the bed was held at 50° C. for 2-12 hours. To the hydrolyzed mixture was added 100 μL of 1 M ammonium hydroxide in isopropanol. A transparent monolithic bed of a sol-gel C18 network was held at 50° C. for two days. The bed was crushed, ground and washed with methylene chloride. The ground particles were screened to isolate a narrow particle size distribution of C18 particles.

Composition 4: Sol-Gel C18 Particles (Acid Catalyzed Followed by Base Catalyzed)

Figure 5:
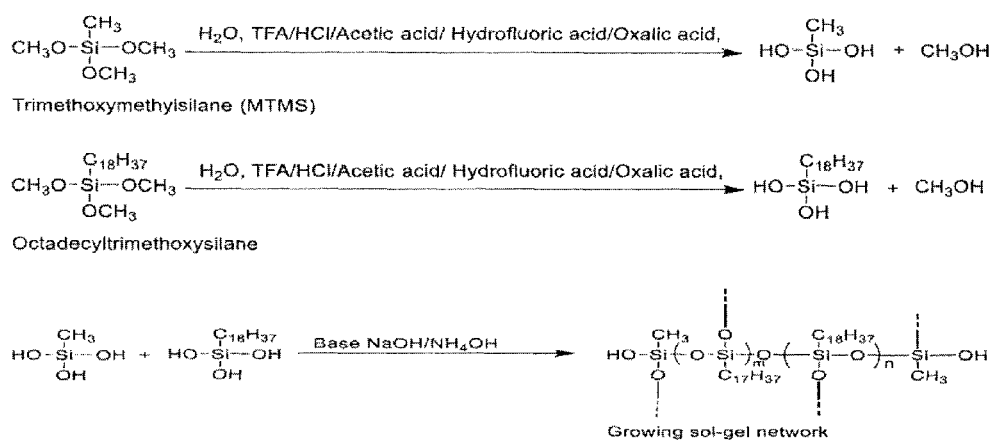
FIG. 5 shows an idealized reaction scheme for the hydrolysis and condensation to a sol-gel C18 sorbent, according to an embodiment of the invention, where an acid hydrolysis of C1 and C18 trialkoxy silanes is followed by base condensation of the silanols formed upon hydrolysis.

As conceptually illustrated in FIG. 5, trimethoxymethylsilane (400 μL) and n-octadecyl trimethoxysilane (200 μL) were combined in in 2000 μL of isopropanol. To the homogeneous solution was added 100 μL of 0.1 M trifluoroacetic acid with vortex mixing. The acid solution was held at 50° C. for 12 hours. To the hydrolyzed mixture was added 100 μL of 1 M ammonium hydroxide in isopropanol. A transparent monolithic bed of a sol-gel C18 network was held at 50° C. for two days. The bed was crushed, ground and washed with methylene chloride. The ground particles were screened to isolate a narrow particle size distribution of C18 particles.

Composition 5: Sol-Gel C18 Particles (Acid Catalyzed Followed by Base Catalyzed)

Figure 6:
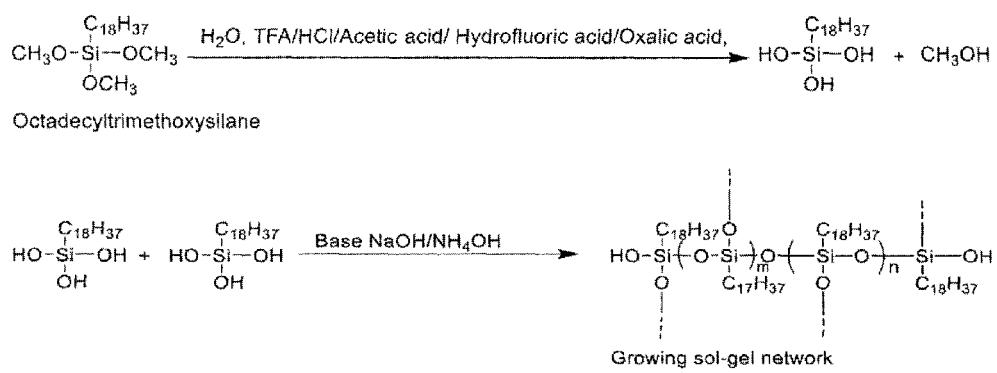
FIG. 6 shows an idealized reaction scheme for the hydrolysis and condensation to a sol-gel C18 sorbent, according to an embodiment of the invention, where an acid hydrolysis of C18 trialkoxy silanes is followed by base condensation of the silanols formed upon hydrolysis.

As conceptually illustrated in FIG. 6, n-octadecyl trimethoxysilane (200 μL) was dissolved in 6000 μL of isopropanol. To the homogeneous solution was added 470 μL of 0.1 M hydrochloric with vortex mixing. The acid solution was held at 50° C. for 12 hours. To the hydrolyzed mixture was added 100 μL of 1 M ammonium hydroxide in isopropanol. A transparent monolithic bed of a sol-gel C18 network was held at 50° C. for two days. The bed was crushed, ground and washed with methylene chloride. The ground particles were screened to isolate a narrow particle size distribution of C18 particles.

Composition 6: Sol-Gel C18 Particles (Acid Catalyzed Followed by Base Catalyzed)

Figure 7:
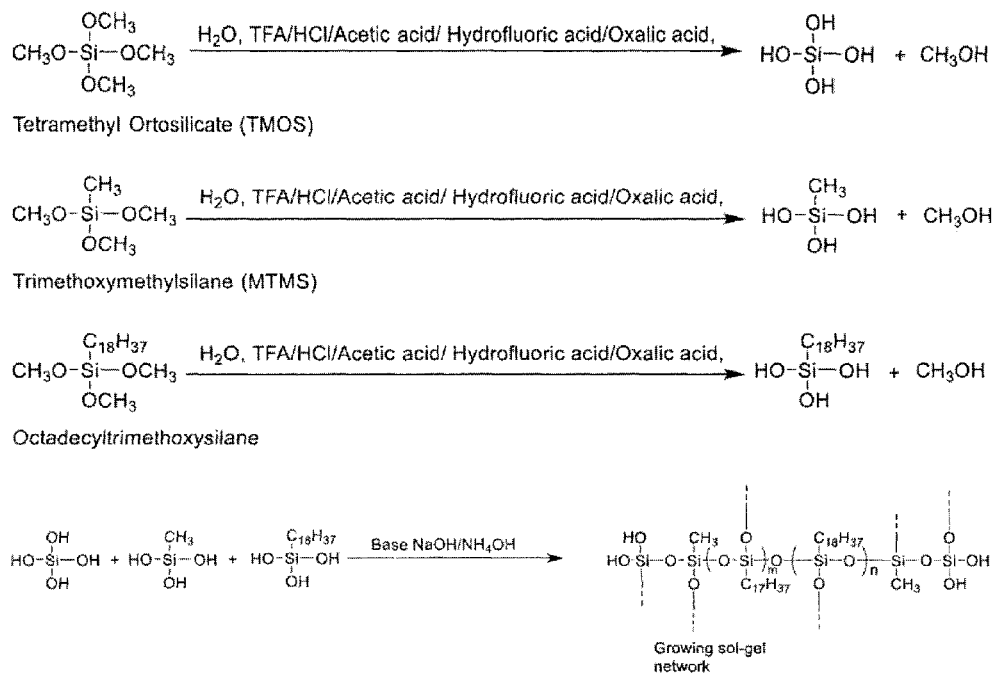
FIG. 7 shows an idealized reaction scheme for the hydrolysis and condensation to a sol-gel C18 sorbent, according to an embodiment of the invention, where an acid hydrolysis of tetraalkoxy and C1 and C18 trialkoxy silanes is followed by base condensation of the silanols formed upon hydrolysis.

As conceptually illustrated in FIG. 7, tetramethoxysilane (500 μL), trimethoxymethylsilane (500 μL), and n-octadecyl trimethoxysilane (300 μL) were combined in in 6000 μL of a 1:1 by volume mixture of methylene chloride and methanol. To the homogeneous solution was added 470 μL of 0.1 M hydrochloric acid with vortex mixing. The acid solution was held at 50° C. for 12 hours. To the hydrolyzed mixture was added 250 μL of 1 M ammonium hydroxide in isopropanol. A transparent monolithic bed of a sol-gel C18 network was held at 50° C. for two days. The bed was crushed, ground and washed with methylene chloride. The ground particles were screened to isolate a narrow particle size distribution of C18 particles.

Composition 7: Sol-Gel C18 Particles (Acid Catalyzed Followed by Base Catalyzed)

Figure 8:
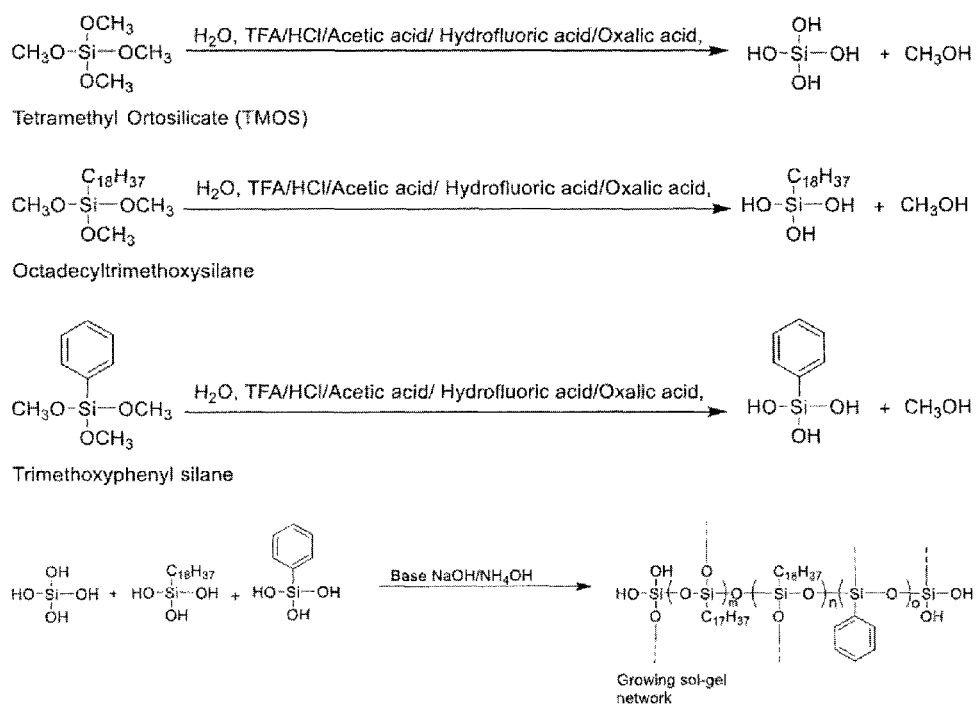
FIG. 8 shows an idealized reaction scheme for the hydrolysis and condensation to a sol-gel C18 sorbent, according to an embodiment of the invention, where an acid hydrolysis of tetraalkoxy and phenyl and C18 trialkoxy silanes is followed by base condensation of the silanols formed upon hydrolysis.

As conceptually illustrated in FIG. 8, tetramethoxysilane (500 μL), trimethoxyphenylsilane (320 μL), and n-octadecyl trimethoxysilane (500 μL) were combined in in 7600 μL of a 1:1 by volume mixture of methylene chloride and methanol. To the homogeneous solution was added 470 μL of 0.1 M acetic acid with vortex mixing. The acid solution was held at 50° C. for 12 hours. To the hydrolyzed mixture was added 300 μL of 1 M ammonium hydroxide in isopropanol. A transparent monolithic bed of a sol-gel C18 network was held at 50° C. for two days. The bed was crushed, ground and washed with methylene chloride. The ground particles were screened to isolate a narrow particle size distribution of C18 particles.

Composition 8: Sol-Gel C18 Particles (Acid Catalyzed Followed by Base Catalyzed)

Figure 9:
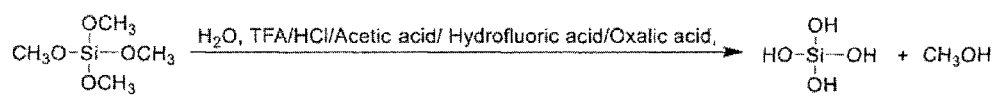
FIG. 9 shows an idealized reaction scheme for the hydrolysis and condensation to a sol-gel C18 sorbent, according to an embodiment of the invention, where an acid hydrolysis of tetraalkoxy and 2-phenylethyl and C18 trialkoxy silanes is followed by base condensation of the silanols formed upon hydrolysis.
Figure 9:
Figure 9:
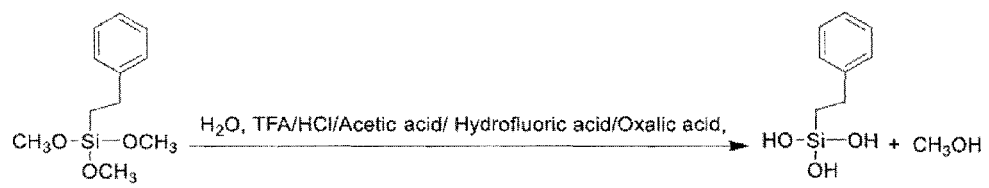
Figure 9:
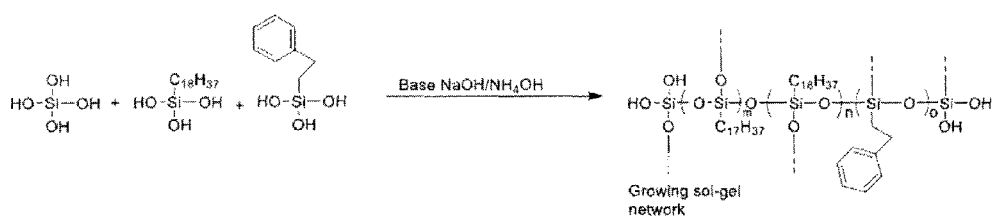

As conceptually illustrated in FIG. 9, tetramethoxysilane (500 μL), trimethoxy-2-phenylethylsilane (320 μL), and n-octadecyl trimethoxysilane (500 μL) were combined in in 7600 μL of a 1:1 by volume mixture of methylene chloride and methanol. To the homogeneous solution was added 470 μL of 0.1 M acetic acid with vortex mixing. The acid solution was held at 50° C. for 12 hours. To the hydrolyzed mixture was added 300 μL of 1 M ammonium hydroxide in isopropanol. A transparent monolithic bed of a sol-gel C18 network was held at 50° C. for two days. The bed was crushed, ground and washed with methylene chloride. The ground particles were screened to isolate a narrow particle size distribution of C18 particles.

Composition 9: Sol-Gel C18 Particles (Acid Catalyzed Followed by Base Catalyzed)

Figure 10:
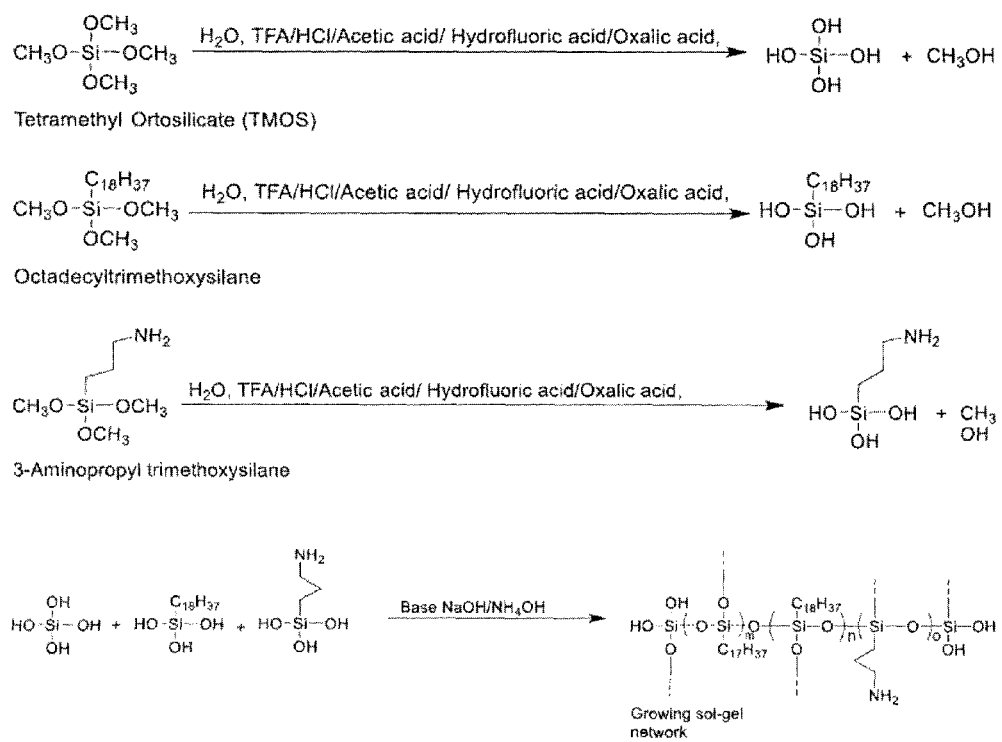
FIG. 10 shows an idealized reaction scheme for the hydrolysis and condensation to a sol-gel C18 sorbent, according to an embodiment of the invention, where an acid hydrolysis of tetraalkoxy and 3-aminopropyl and C18 trialkoxy silanes is followed by base condensation of the silanols formed upon hydrolysis.

As conceptually illustrated in FIG. 10, tetramethoxysilane (1000 µL), and n-octadecyl trimethoxysilane (300 µL) were combined in in 7600 µL of isopropanol. To the homogeneous solution was added 470 µL of 0.1 M hydrochloric acid with vortex mixing. The acid solution was held at 50° C. for 12 hours. 3-Aminopropyl)trimethoxysilane (320 µL) was added to the mixture and held at 50° C. for 1 hour. To the hydrolyzed mixture was added 300 µL of 1 M ammonium hydroxide in isopropanol. A transparent monolithic bed of a sol-gel C18 network was held at 50° C. for two days. The bed was crushed, ground and washed with methylene chloride. The ground particles were screened to isolate a narrow particle size distribution of C18 particles.

Composition 10: Sol-Gel C18 Particles (Acid Catalyzed Followed by Base Catalyzed)

Figure 11:
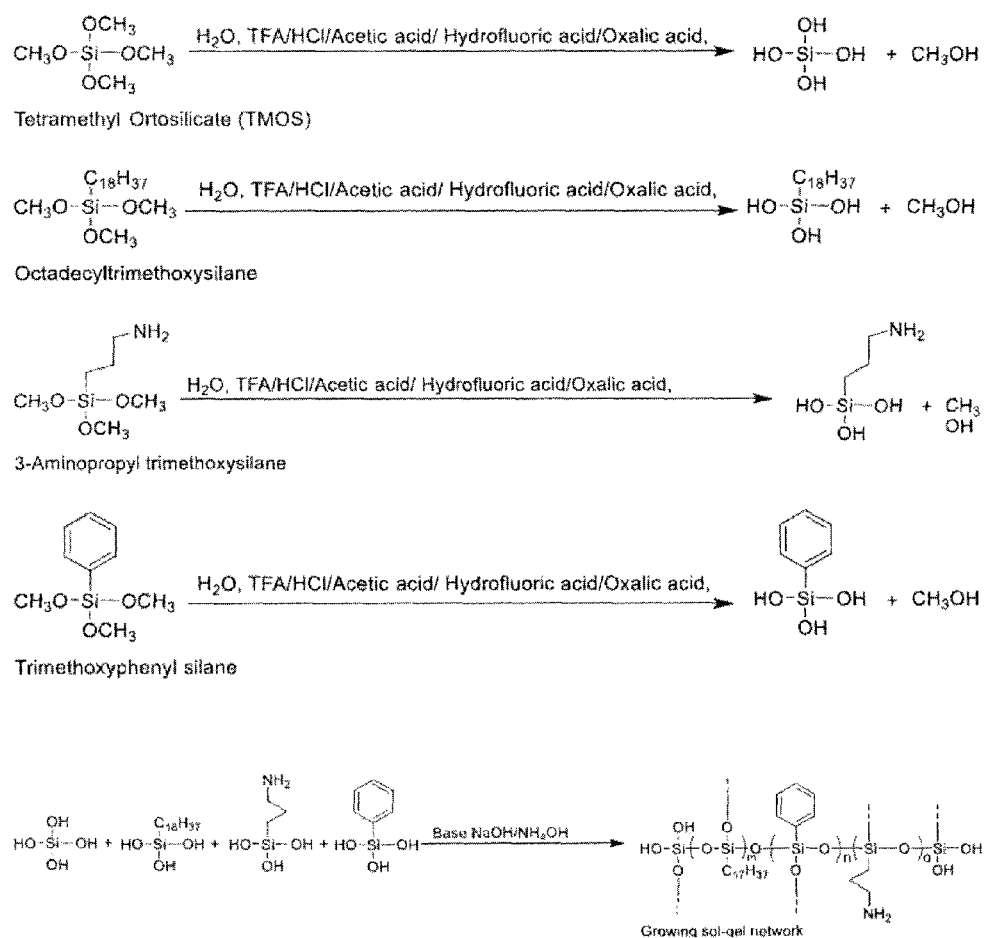
FIG. 11 shows an idealized reaction scheme for the hydrolysis and condensation to a sol-gel C18 sorbent, according to an embodiment of the invention, where an acid hydrolysis of tetraalkoxy and phenyl, 3-aminopropyl, and C18 trialkoxy is followed by base condensation of the silanols formed upon hydrolysis.

As conceptually illustrated in FIG. 11, tetramethoxysilane (1000 µL), and n-octadecyl trimethoxysilane (300 µL) were combined in in 7600 µL of isopropanol. To the homogeneous solution was added 470 µL of 0.1 M hydrochloric acid with vortex mixing. The acid solution was held at 50° C. for 12 hours. (3-Aminopropyl)trimethoxysilane (320 µL) and trimethoxyphenylsilane (330 µL) were added to the mixture and held at 50° C. for 1 hour. To the hydrolyzed mixture was added 300 µL of 1 M ammonium hydroxide in isopropanol. A transparent monolithic bed of a sol-gel C18 network was held at 50° C. for two days. The bed was crushed, ground and washed with methylene chloride. The ground particles were screened to isolate a narrow particle size distribution of C18 particles.

Composition 11: Sol-Gel C18 Particles (Acid Catalyzed Followed by Base Catalyzed)

Figure 12:
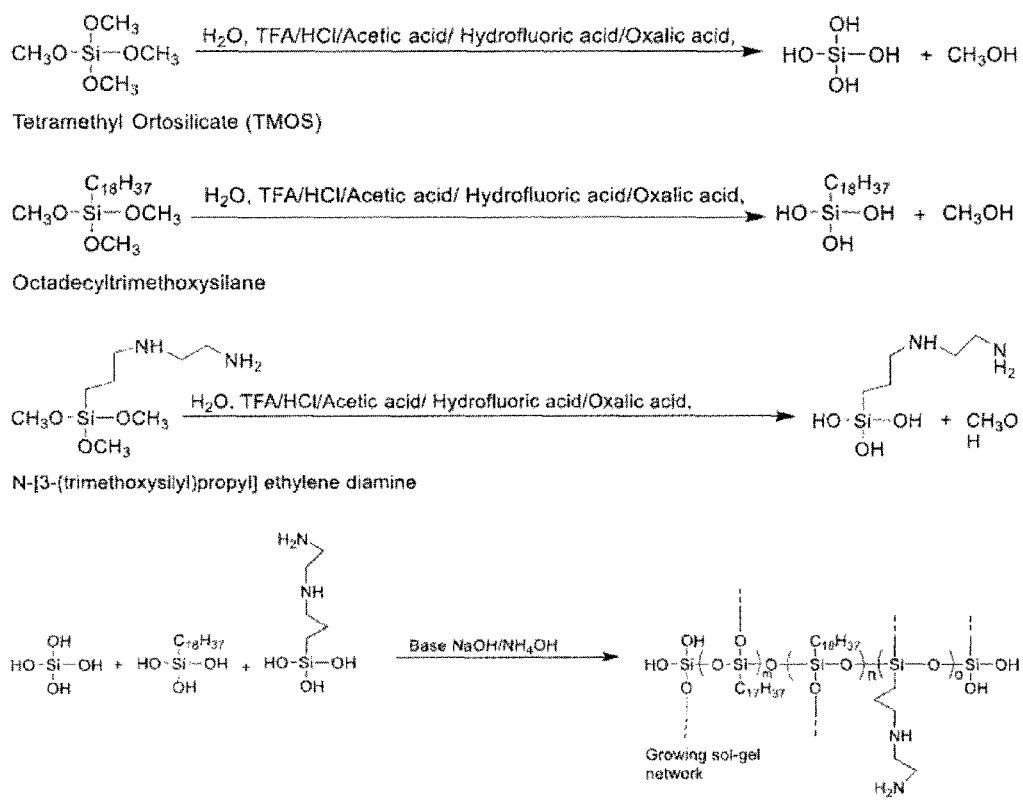
FIG. 12 shows an idealized reaction scheme for the hydrolysis and condensation to a sol-gel C18 sorbent, according to an embodiment of the invention, where an acid hydrolysis of tetraalkoxy and 3-(2 aminoethylamino)propyl and C18 trialkoxy silanes is followed by base condensation of the silanols formed upon hydrolysis.

As conceptually illustrated in FIG. 12, tetramethoxysilane (1000 µL), and n-octadecyl trimethoxysilane (300 µL) were combined in in 7600 µL of isopropanol. To the homogeneous solution was added 470 µL of 0.1 M hydrochloric acid with vortex mixing. The acid solution was held at 50° C. for 12 hours. N-[3-(trimethoxysilyl)propyl]ethylene diamine (320 µL) were added to the mixture and held at 50° C. for 1 hour. To the hydrolyzed mixture was added 300 µL of 1 M ammonium hydroxide in isopropanol. A transparent monolithic bed of a sol-gel C18 network was held at 50° C. for two days. The bed was crushed, ground and washed with methylene chloride. The ground particles were screened to isolate a narrow particle size distribution of C18 particles.

Composition 12: Sol-Gel C18 Particles (Acid Catalyzed Followed by Base Catalyzed)

Figure 13:
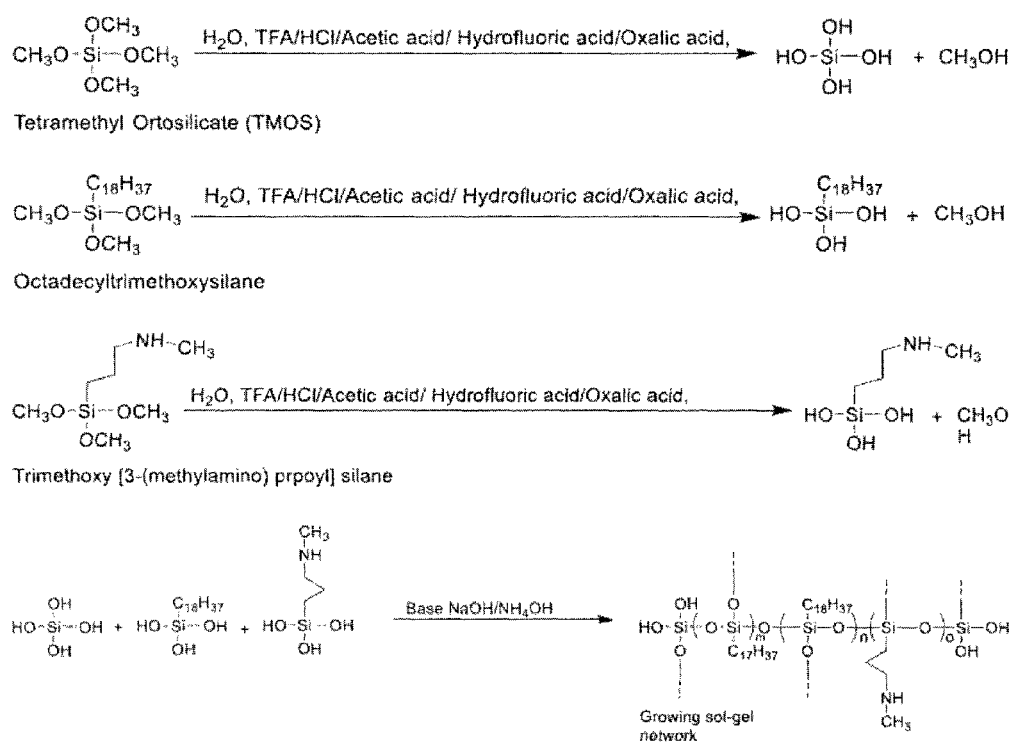
FIG. 13 shows an idealized reaction scheme for the hydrolysis and condensation to a sol-gel C18 sorbent, according to an embodiment of the invention, where an acid hydrolysis of tetraalkoxy and 3-(methylamino)propyl and C18 trialkoxy silanes is followed by base condensation of the silanols formed upon hydrolysis.

As conceptually illustrated in FIG. 13, tetramethoxysilane (1000 µL), and n-octadecyl trimethoxysilane (300 µL) were combined in in 7600 µL of isopropanol. To the homogeneous solution was added 470 µL of 0.1 M hydrochloric acid with vortex mixing. The acid solution was held at 50° C. for 12 hours. Triethoxy[3-methylamino)propyl]silane (320 µL) were added to the mixture and held at 50° C. for 1 hour. To the hydrolyzed mixture was added 300 µL of 1 M ammonium hydroxide in isopropanol. A transparent monolithic bed of a sol-gel C18 network was held at 50° C. for two days. The bed was crushed, ground and washed with methylene chloride. The ground particles were screened to isolate a narrow particle size distribution of C18 particles.

Composition 13: Sol-Gel C18 Particles (Acid Catalyzed Followed by Base Catalyzed)

Figure 14:
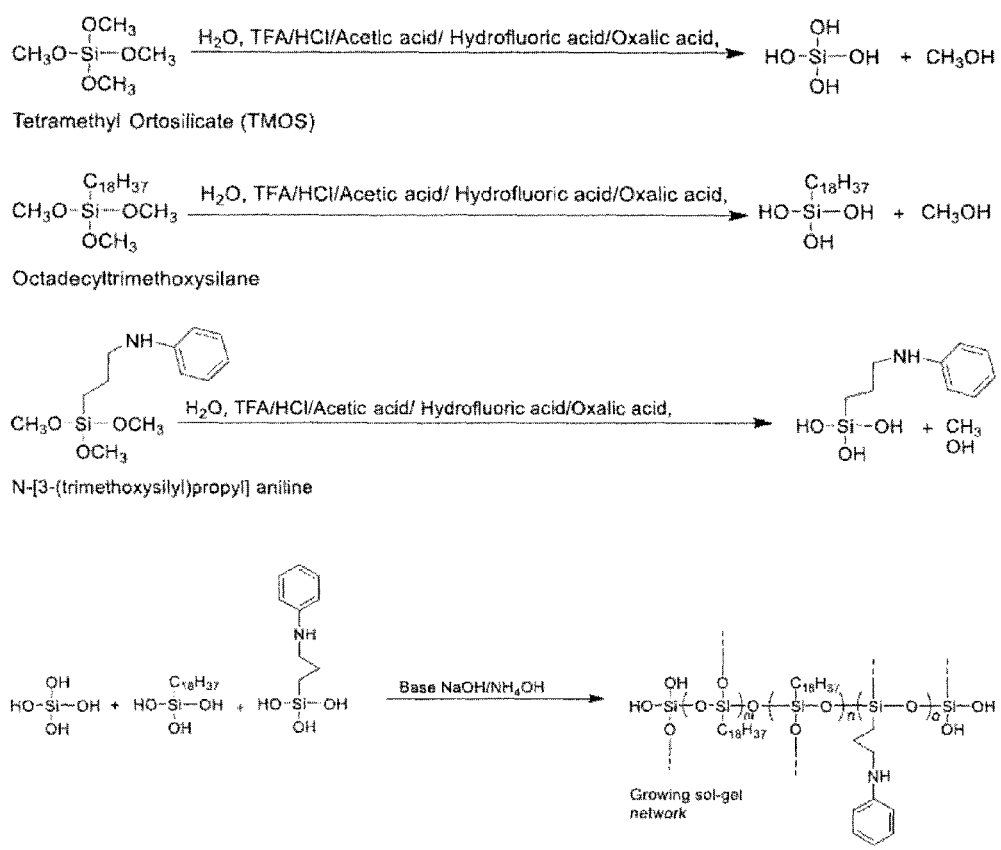
FIG. 14 shows an idealized reaction scheme for the hydrolysis and condensation to a sol-gel C18 sorbent, according to an embodiment of the invention, where an acid hydrolysis of tetraalkoxy and 3-(phenylamino)propyl and C18 trialkoxy silanes is followed by base condensation of the silanols formed upon hydrolysis.

As conceptually illustrated in FIG. 14, tetramethoxysilane (1000 µL), and n-octadecyl trimethoxysilane (300 µL) were combined in in 7600 µL of isopropanol. To the homogeneous solution was added 470 µL of 0.1 M hydrochloric acid with vortex mixing. The acid solution was held at 50° C. for 12 hours. N-(2-N-Phenylaminoethyl)-3-aminopropylsilane (320 µL) was added to the mixture and held at 50° C. for 1 hour. To the hydrolyzed mixture was added 300 µL of 1 M ammonium hydroxide in isopropanol. A transparent monolithic bed of a sol-gel C18 network was held at 50° C. for two days. The bed was crushed, ground and washed with methylene chloride. The ground particles were screened to isolate a narrow particle size distribution of C18 particles.

Composition 14: Sol-Gel C18 Particles (Acid Catalyzed Followed by Base Catalyzed)

Figure 15:
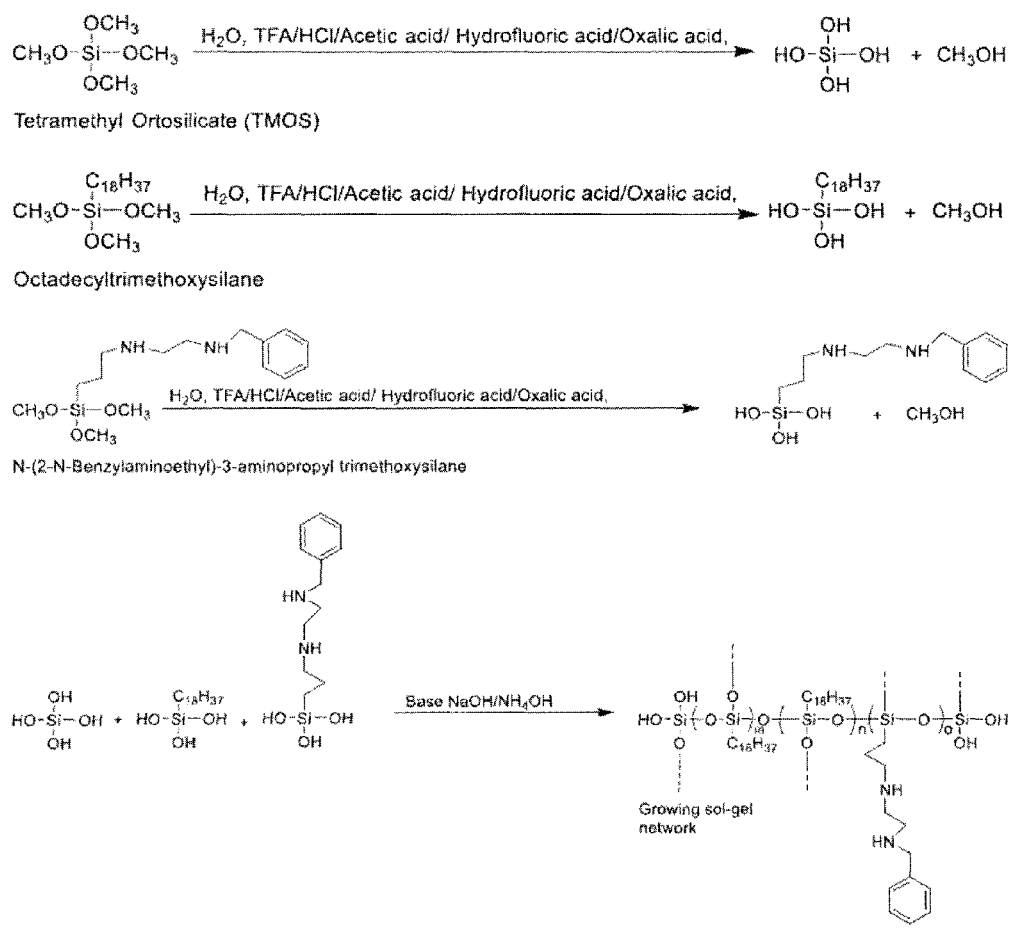
FIG. 15 shows an idealized reaction scheme for the hydrolysis and condensation to a sol-gel C18 sorbent, according to an embodiment of the invention, where an acid hydrolysis of tetraalkoxy and 3-(2-(2-phenylethyl)amino-ethyl)propyl and C18 trialkoxy silanes is followed by base condensation of the silanols formed upon hydrolysis.

As conceptually illustrated in FIG. 15, tetramethoxysilane (1000 µL), and n-octadecyl trimethoxysilane (300 µL) were combined in in 7600 µL of isopropanol. To the homogeneous solution was added 470 µL of 0.1 M hydrochloric acid with vortex mixing. The acid solution was held at 50° C. for 12 hours. N-(2-N-benzylaminoethyl)-3-aminopropyltrimethoxysilane (320 µL) was added to the mixture and held at 50° C. for 1 hour. To the hydrolyzed mixture was added 300 µL of 1 M ammonium hydroxide in isopropanol. A transparent monolithic bed of a sol-gel C18 network was held at 50° C. for two days. The bed was crushed, ground and washed with methylene chloride. The ground particles were screened to isolate a narrow particle size distribution of C18 particles.

Composition 15: Sol-Gel C18 Particles (Acid Catalyzed Followed by Base Catalyzed)

Figure 16:
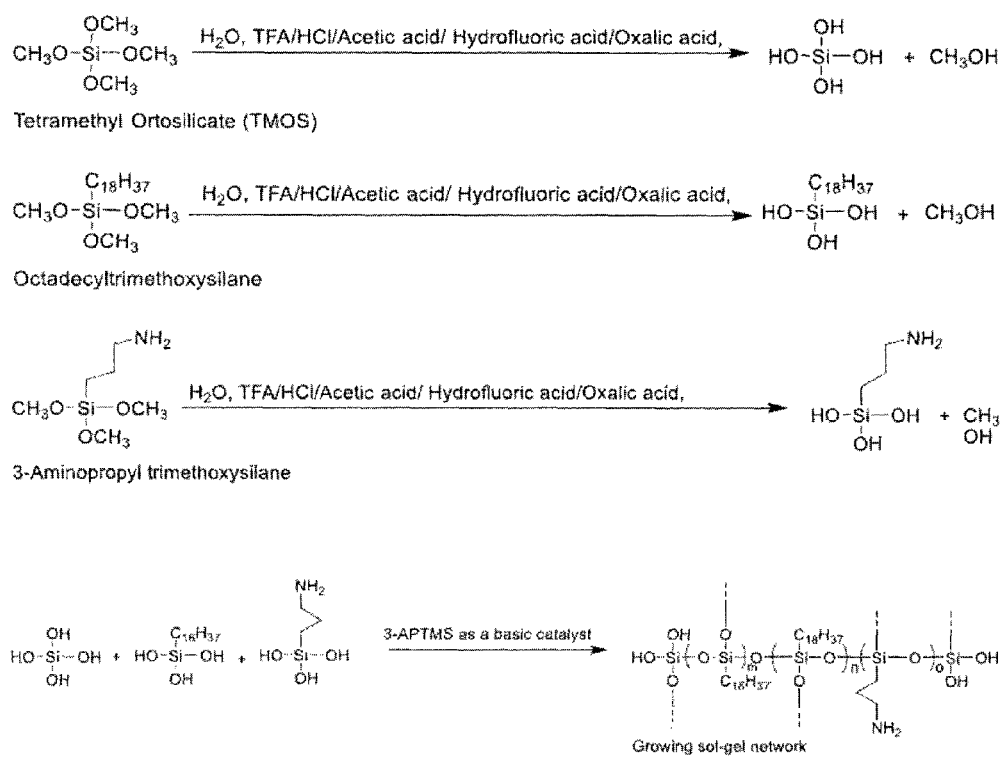
FIG. 16 shows an idealized reaction scheme for the hydrolysis and condensation to a sol-gel C18 sorbent, according to an embodiment of the invention, where an acid hydrolysis of tetraalkoxy and 3-aminopropyl and C18 trialkoxy silanes is followed by base condensation of the silanols formed upon hydrolysis where additional 3-aminopropyltrimethoxy silane is used as the base.

As conceptually illustrated in FIG. 16, tetramethoxysilane (1000 µL), and n-octadecyl trimethoxysilane (300 µL) were combined in in 7600 µL of isopropanol. To the homogeneous solution was added 470 µL of 0.1 M hydrochloric acid with vortex mixing. The acid solution was held at 50° C. for 12 hours. (3-Aminopropyl)trimethoxysilane (320 µL) was added to the mixture and held at 50° C. for 1 hour. To the hydrolyzed mixture was added 300 µL of additional (3-Aminopropyl)trimethoxysilane. A transparent monolithic bed of a sol-gel C18 network was held at 50° C. for two days. The bed was crushed, ground and washed with methylene chloride. The ground particles were screened to isolate a narrow particle size distribution of C18 particles.

Extraction Performance of Sol-Gel C18 Sorbents

FIG. 1 shows a bar chart of the extraction efficiency of the various analytes in solution where the analytes display a wide range of polarity (partitioning between oil and water, log $K_{ow}$). The structures and log $K_{ow}$'s of the analytes are shown in FIG. 2. As can be seen in the Figures, the sorbents, according to embodiments of the invention, are superior to commercially available C18 sorbents for compounds of log $K_{ow}$ less than 4 and equivalent for log $K_{ow}$ equal or greater than 4 that contain functional groups.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A chromatographic stationary phase or solid phase extraction (SPE) sorbent, comprising highly porous sol-gel metal oxide particles comprising metal oxide network units with organic functionality bonded to at least some metal atoms of the metal oxide network, wherein the particles are prepared by a sequential acid catalyzed then base catalyzed sol-gel process to impart a BET surface area is 650 m²/g and a pore width of 30 Å, where the organic functionality is selected from alkyl, substituted alkyl, aryl, or any combination thereof, wherein organic functionality is distributed throughout the particles; and wherein the mole percent of metal atoms of the metal oxides with bonded organic functionality is 9 to 100 mole percent.

2. The chromatographic stationary phase or SPE sorbent according to claim 1, wherein the metal oxides are oxides of silicon, titanium, aluminum, zirconium, germanium, barium, gallium, indium, thallium, vanadium, cobalt, nickel, chromium, copper, iron, zinc, boron or any mixture thereof and where the organic functionalities are: linear or branched C1 to C24 alkyl that is unsubstituted or substituted with phenyl, amino, alkylamino, hydroxyl, alkoxyl, arylamino, cyano, fluoro, phenyl, cyclodextrin, crown ether, cryptand, calixarene, or any derivative thereof; or aryl that is unsubstituted or substituted with phenyl, amino, alkylamino, hydroxyl, alkoxyl, arylamino, cyano, fluoro, phenyl, cyclodextrin, crown ether, cryptand, calixarene, or any derivative thereof.

3. The chromatographic stationary phase or SPE sorbent according to claim 1, wherein the metal oxide is silicon oxide.

4. The chromatographic stationary phase or SPE sorbent according to claim 1, wherein the organic functionality is selected from methyl, octyl, octadecyl, phenyl, 2-phenylethyl, 3-aminopropyl, 3-(2-aminoethylamino)propyl, 3-methylaminopropyl, 3-phenylaminopropyl, and 3-(2-benzylaminoethyl)propyl.

5. A method of preparing a chromatographic stationary phase or SPE sorbent according to claim 1, comprising:

providing a multiplicity of at least one first metal oxide precursor, wherein at least 9 percent of the metal oxide precursors have one or two organic functionalities bonded to the metal oxide precursor;

mixing at least a portion of the metal oxide precursors with a solvent or solvent mixture and an acid and water to form a sol;

optionally adding at least one second metal oxide precursor having at least one organic functionality that is the same or different than the organic functionalities of the first metal oxide precursors to the sol;

adding a base to the sol;

holding the sol until the sol converts into a gel;

crushing or grinding the gel to form sol-gel metal oxide particles that comprise the chromatographic stationary phase or SPE sorbent.

6. The method of claim 5, wherein the metal oxides precursors are of the structure $MR^1R^2R^3R^4$ where M is silicon, titanium, aluminum, zirconium, germanium, barium, gallium, indium, thallium, vanadium, cobalt, nickel, chromium, copper, iron, zinc, boron or any mixture thereof where $R^1$ and $R^2$ are hydrogen, alkoxy, hydroxy, halide, or dialkylamino, $R^3$ and $R^4$ are optionally hydrogen, alkoxy, hydroxy, halide, or dialkylamino, which are lost on hydrolysis to form hydroxyl groups, a majority of which condense to form the metal oxide, and at least some of $R^3$ and $R^4$, independently, are absent or are substituted or unsubstituted linear or branched C1 to C24 alkyl, substituted or unsubstituted aryl wherein the substituent is phenyl, amino, alkylamino, hydroxyl, alkoxyl, arylamino, cyano, fluoro, phenyl, cyclodextrin, crown ether, cryptand, calixarene, or any derivative thereof.

7. The method of claim 5, wherein the acid is selected from hydrochloric acid, trifluoracetic acid, acetic acid, hydrofluoric acid, and oxalic acid.

8. The method of claim 5, wherein the base is selected from sodium hydroxide, potassium hydroxide, ammonium hydroxide, or an aminoalkylsilane.

9. The method of claim 5, wherein the solvent is a C1 to C3 alcohol or a mixture of a C1 to C3 alcohol and methylene chloride.

10. The method of claim 5, wherein the crushing or grinding is to a particle size of 40 to 50 microns for SPE sorbent and 2 to 5 microns for chromatography stationary phases.

11. A method of performing solid phase extraction, comprising placing a device comprising the SPE sorbent according to claim 1 in an environment containing a compound to remove from the environment.

12. The method of claim 11, wherein the device is a container that retains the SPE sorbent and allows the contact with the environment while being retained within the container.

13. A chromatography column, comprising a column packing comprising the chromatographic stationary phase according to claim 1.

* * * * *